United States Patent [19]

Persons, II et al.

[11] Patent Number: 4,957,286

[45] Date of Patent: Sep. 18, 1990

[54] SEAT WITH WEIGHT MEASURING CAPABILITIES

[75] Inventors: Charles A. Persons, II, Huron; James D. Goostree, Norwalk, both of Ohio

[73] Assignee: The Faulhaber Co., Monroeville, Ohio

[21] Appl. No.: 481,787

[22] Filed: Feb. 16, 1990

Related U.S. Application Data

[63] Continuation of Ser. No. 257,763, Oct. 14, 1988, abandoned.

[51] Int. Cl.⁵ .............................................. A63B 23/00
[52] U.S. Cl. ...................................... 272/73; 297/199; 73/379
[58] Field of Search ...................... 272/73, 130, 93, 67, 272/68; 177/208, 144; 73/379; 297/199

[56] References Cited

U.S. PATENT DOCUMENTS

| 2,111,671 | 3/1938 | McKinney . | |
|---|---|---|---|
| 3,217,818 | 11/1965 | Engelsher et al. | 177/208 |
| 3,785,644 | 1/1974 | Bradley et al. . | |
| 4,013,135 | 3/1977 | Kechely . | |
| 4,378,111 | 3/1983 | Tsuchida et al. . | |
| 4,429,915 | 2/1984 | Flager | 297/199 |
| 4,537,266 | 8/1985 | Greenberg | 177/208 |
| 4,592,371 | 6/1986 | Pellicano et al. | 73/379 |
| 4,611,851 | 9/1986 | Noyes et al. | 297/199 |
| 4,697,656 | 10/1987 | de Canecaude . | |

FOREIGN PATENT DOCUMENTS 0197530 10/1957 Fed. Rep. of Germany .... 73/379 R

OTHER PUBLICATIONS

The Washington Daily News-City Edition, Jun. 13, 1961, "The Best From Abroad".

Primary Examiner—Stephen R. Crow
Attorney, Agent, or Firm—D. Peter Hochberg; Mark Kusner; Louis J. Weisz

[57] ABSTRACT

A weight indicating seat for an exercise device having a pneumatic system associated therewith comprising a pneumatic bladder located in the seat which is connected to a gauge calibrated to indicate weight proportional to the pressure within the bladder. A pumping bulb is also connected to the pneumatic system to allow air to be added to or removed from the bladder.

5 Claims, 2 Drawing Sheets

SEAT WITH WEIGHT MEASURING CAPABILITIES

This is a continuation of co-pending application Ser. No. 257,763 filed on 10/14/88, now abandoned.

TECHNICAL FIELD

This invention relates to a weight measuring device. More particularly, this invention relates to a weight measuring device used in connection with an exercise apparatus. Specifically, this invention relates to a seat for an exercise device having an air bladder positioned therein, connected by tubing to an air pressure indicator which provides a measure of the weight of the person sitting on the seat.

BACKGROUND OF THE INVENTION

It has long been established that there is a direct correlation between the health and life expectancy of individuals and their weight, in relation to their height and build. Individuals exceeding weight norms for those within their categories do so at the risk of increasing of the probability of eventually experiencing health problems, as well as decreased longevity. In addition, a "trim look" is associated by many with an attractive, more youthful appearance, and individuals having weights within the proper range usually feel more energetic, and have a greater overall-sense of well-being than do overweight individuals. In view of the preceding, therefore, there has been an increasing emphasis on the part of most individuals to control their weight within proper limits. This includes attention to the control of their diet and calorie intake, as well as exercise, to facilitate weight control. As a result of the foregoing, a wide variety of exercise equipment has been designed for those wishing to exercise, including stationary exercisers, rowing machines, as well as other equipment. By the use of such fitness equipment, users can lose significant amounts of weight, thereby achieving the aforementioned benefits.

Although the benefits of exercise are self-evident, many find the process of exercise somewhat tedious and boring, and the reinforcement gained by observation of the weight loss achieved through exercise can be an important factor in sustaining interest in an exercise program, and in encouraging a user to continue with it. Typically, monitoring of progress insofar as weight gain is concerned is accomplished through the periodic use of a separate weight scale. While a scale provides an intermittent way of tracking exercise results, it has the inherent disadvantage of failing to allow users to know how much weight is being lost during the actual exercise period, thus it fails to provide encouragement during the exercise period, at the very time when it is most beneficial.

DISCLOSURE OF THE INVENTION

In view of the foregoing, therefore, it is a first aspect of this invention to encourage those engaged in physical exercise to continue such exercise.

A second aspect of the invention is to provide the use of physical fitness equipment having the ability to display weight loss during the actural exercise period.

Another aspect of this invention is to furnish a seat for exercise equipment with means for substantially continuously indicating the loss of weight experienced by an individual positioned on the seat, over a period of time.

A further aspect of this invention is to provide an exercise seat with a remote weight measuring read-out device visible to a person using the seat.

An additional aspect of the invention is to make available an exercise seat which allows a user of the exercise equipment to monitor weight loss without losing the continuity of an exercise program. Still another aspect of the invention is to provide a more comfortable seat for an individual using an exercise device, which seat permits abservation of weight loss during the exercise period.

Another aspect of this invention is to permit an individual using an exercise machine to continuously observe his weight loss progress with a device which does not require attachment to a source of electric power, or the use of liquid hydraulic systems.

The foregoing and additional aspects of the invention are provided by a weight indicating device comprising a compressible container defining a chamber for receiving a gas, a platform for supporting said container and a load applied to said container, the load varying the pressure in said container, indicator means for indicating the pressure within said chamber, and means for connecting said chamber to said indicator means.

The foregoing and further aspects of the invention are provided by a weight measuring seat for an exercise device, said seat comprising: an air-filled elastomeric bladder for supporting the weight of an individual seated on the seat; a pressure indicator remote from said bladder for indicating the air pressure in said bladder, said indicator being visible to said seated individual; tubing for interconnecting said bladder and said indicator; a pump for pumping air into said bladder; and tubing for interconnecting said pump and said bladder.

DETAILED DESCRIPTION OF THE INVENTION

Figure 1:
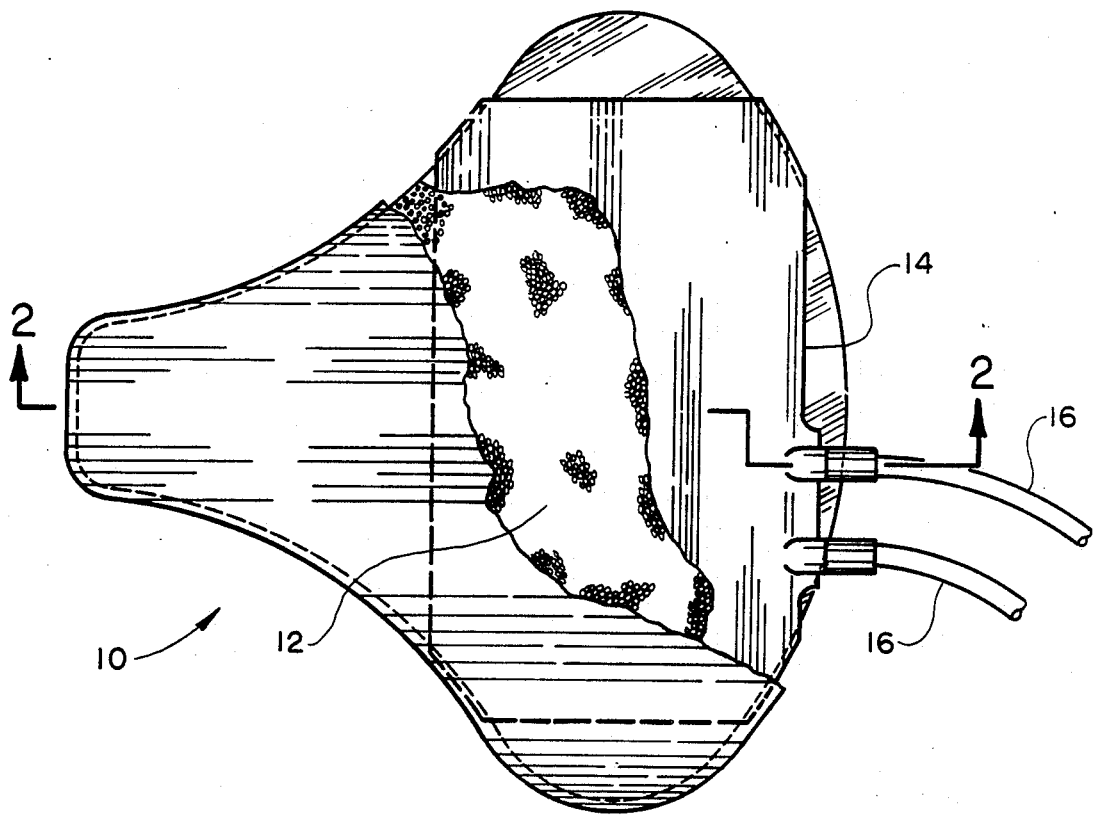
Fig. 1 is a partially broken-away plan view of a bicycle seat adapted for use with the invention.

FIG. 1 shows a partially broken-away plan view of a bicycle seat, generally 10, adapted for use with the invention. In the Figure, seat cushioning material 12 is shown positioned over a bladder 14, the latter being connected to tubing 16.

To monitor weight loss progress, for example, in the case of a bicycle to which the device is attached, the user merely momentarily lifts his feet from the pedals, at the same time minimizing the amount of his weight resting on the handle bars, and observes a read-out instrument to which the air-filled bladder is connected. By so doing, substantially the entire weight of the individual resets upon the compressible bladder, increasing the pressure of the air within it, an increase which is transmitted to, and reflected in the read-out instrument to which the tubing is connected. Prior to the weighing operation described, the air pressure within the bladder is adjusted by a means described more particularly hereafter, to a point which allows the bladder provide comfortable cushioning to the buttocks of the user, and at the same time resulting in a satisfactory reading on the read-out instrument.

The bladder 14 may be conveniently made from a flexible, substantially air-impervious material, advantageously on elastomer such as natural or synthetic rubber, SBR, butyl rubber, or others, all being satisfactory for the purpose.

The seat cushioning material 12, may be padding, such as upholstery padding or wadding, or it may be a foam material, synthetic foams being especially desirable for the use, including particularly materials such as polyurethane foams.

Figure 2:
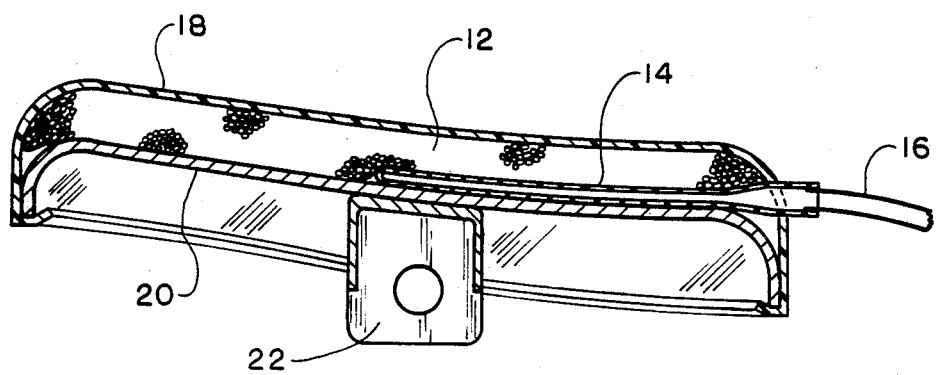
FIG. 2 is a sectional side elevation of the bicycle seat of FIG. 1 along line 2-2 of FIG. 1.

FIG. 2 shows a sectional side elevation view of the bicycle seat of FIG. 1 along line 2—2 of FIG. 1. As illustrated, the seat comprises a seat cover 18 enclosing the seat cushioning material 12, which is shown positioned on top of bladder 14, but which may encapsulate it. The foam and bladder are located over, and supported by seat base 20, which is fastened to seat support post 22. Tubing 16 connects the bladder to a read-out device which is not shown.

While reference has been made to the fact that the seat assembly 10 is illustrated in connection with a bicycle, it is to be understood that the invention has equal application to other types of machines and appliances, for instance, rowing machines, stationery exercise devices, weight benches, wheel chairs, and others. While the device of the invention can be furnished as original equipment with the appliance as manufactured, it also lends itself to retrofitting operations, as its use becomes indicated.

Figure 3:
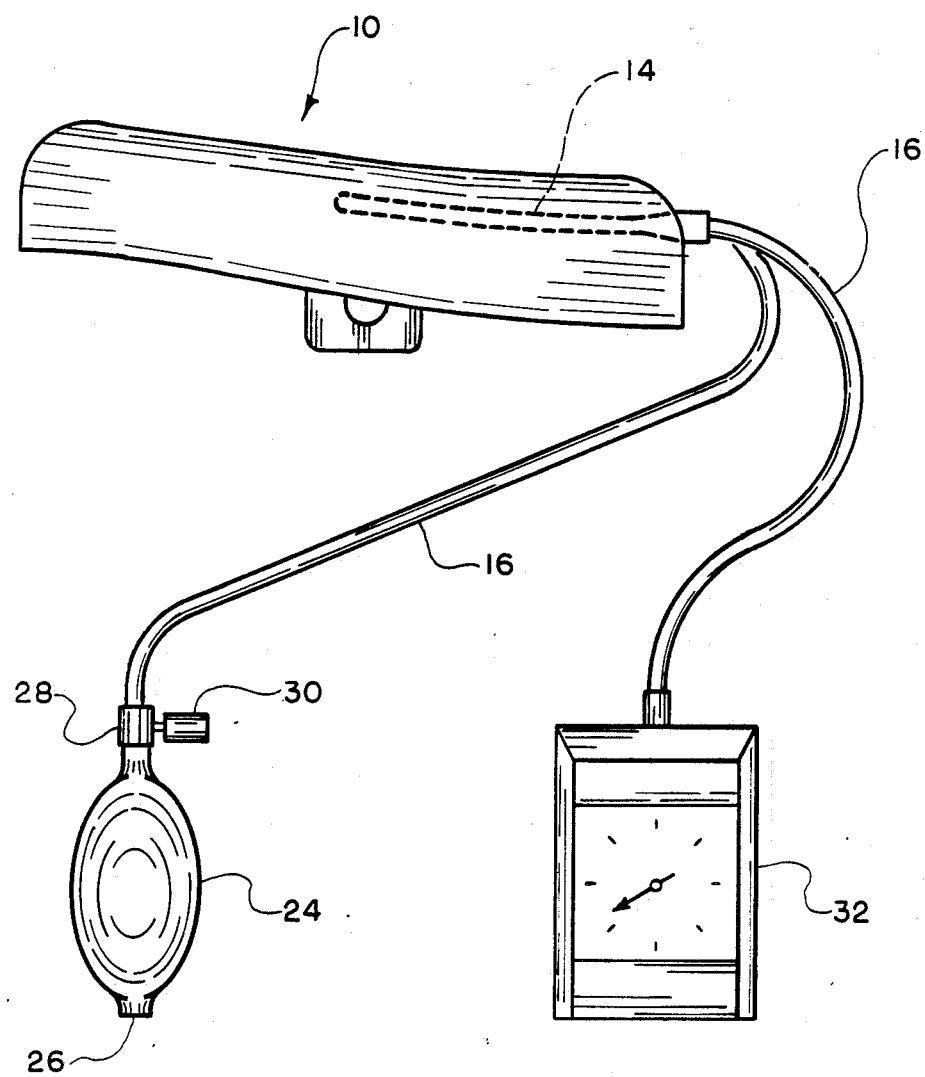
FIG. 3 is a side elevation of the bicycle seat of FIG. 1 with views of other components which may be used in association with the invention.

FIG. 3 is a side elevation of the bicycle seat of FIG. 1 with views of other components which may be employed in association with the invention. The FIG. shows bicycle seat assembly 10 with a bladder 14 positioned therein, the bladder being attached by tubing 16, respectively, to a read-out device 32, in the case of the figure a pressure gauge, and to a pumping bulb 24. The pumping bulb is provided with an opening to the atmosphere 26, and to a check valve 28 whose action may be circumvented by operation of the valve pressure release knob 30, releasing the pressure within the bladder. While the figures illustrate the use of a bladder-type pressure reservoir, other systems may also be used, for example, an enclosed bellows, or other compressible gas-filled chambers.

The read-out meter 32 is activated by air pressure, as previously indicated; however, the scale figures appearing on the face of the dial may be shown as the user's weight in pounds or other units of weight by a calibrating conversion well within the capability of those skilled in the art.

The read-out may be located at any convenient point, relative to the equipment with which the weight indicating device of the invention is used, for example, in the case of a bicycle, it may conveniently be located on the handle bars. Alternatively, it may be attached to other portions of the equipment, or to a free-standing pedestal, the only requirement being that it be easily visible to a user. In addition, the read-out meter may be combined with other indicating devices employed in connection with the equipment, such as pulse rate indicators, speedometers, ergometers, elapsed time indicators, or others.

The indicating range of the read-out meter may cover the entire anticipated weight of users, or it may employ a scale covering a smaller weight range, in which case the increments of weight can be expanded and more easily read. In most instances, the latter scale is preferable, since most users are primarily interested in the increment of weight loss during the exercise period, rather than their actual weight at the beginning and end of the period.

While a pressure gauge constitutes a preferred mode for indicating weight, in part because of its simplicity and relative low cost, other mechanisms may be used, for example, a transducer device acted upon by gas pressure, and in turn activating an LED read-out, or a meter appropriately calibrated to convert electrical signals into an indication of weight.

The check valve 28 may be located at any point in the pneumatic train comprising the bladder 14, tubing 16, and pumping bulb 24. It can, for instance, be located adjacent to the pumping bulb 24, between the bulb and the bladder 14, as shown in FIG. 3, or it could be located at the unattached end of the bulb, or elsewhere. Conveniently, the relief valve is fabricated in a "tee" mounting configuration, i.e., with short tubular extensions on either end of the valve to facilitate its interconnection with the other components of the pneumatic system. Passage of air through the valve during the pumping operation is limited so that air can only flow towards the bladder. However, when the valve pressure release knob 30 is turned to the appropriate position, air within the bladder is able to escape through the valve, facilitating adjustment of pressure gauge 32 to a desired initial reading.

Referring again to FIG. 1, while two entry points for tubing 16 into the bladder are shown, permitting the arrangement of components as shown in FIG. 3, the position of the elements of the weight indicating device may be altered in a manner such that only one entry point into the bladder is provided, with the tubing attached thereto subsequently dividing to allow connection to the pressure gauge 32, and pumping bulb The use of the bladder arrangement provided has notable advantages over other systems, for example, electronic devices, or hydraulic systems, in that the device of the invention is continuously operable without any need for interconnection with any external source of electrical energy such as batteries or a power outlet. Furthermore, it avoids the complexity and expense of hydraulic systems, which also frequently have a tendency to leak, introducing errors in the desired weight measurement.

While in accordance with the patent statutes, a preferred embodiment and best mode has been presented, the scope of the invention is not limited thereto, rather is measured by the scope of the attached claims.

What is claimed is:

1. A weight monitoring exercise device comprising:
a bicycle seat;
a seat-connecting post;
pedal-driven exercise means; and
weight monitoring means,
in which said bicycle seat is attached to said seat-connecting post, and said post is connected to said exercise means, wherein said weight monitoring means comprises a compressible, gas-holding container elastomeric mounted within said seat, said seat comprising a seat cover enclosing seat cushioning material which encapsulates said container said container connected to a meter responsive to changes in the pressure of said gas, said meter being mounted on said exercise means so as to be visible to an individual seated on said seat, whereby a person on said seat can observe meter reading differences occurring as the result of gas pressure changes in said container caused from body-weight loss produced by an individual exercising on said device.

2. A device according to claim 1 in which said device is an exercise bicycle, wherein said weight monitoring means is, connected by tubing to an air pressure meter mounted on said bicycle forward of said seat.

3. A device according to claim 2 in which there is also provided means for pumping gas into said container, and means for releasing said gas to the atmosphere.

4. A pedal-operated exercise bicycle comprising:
a bicycle frame;
a bicycle seat;
a seat-connecting post;
a compressible, air-holding bladder;
an air pressure-responsive meter; and
tubing connecting said bladder and said meter,
in which said bicycle seat is attached to said seat-connecting post, and said post is connected of said bicycle frame, said bladder being mounted within said seat, said seat comprising a seat cover enclosing seat cushioning material which encapsulates said bladder, and said meter being mounted on said bicycle frame forward of said seat so as to be visible to an individual seated on said seat, whereby a person seated on said seat can observe meter reading differences occurring as a result of air pressure changes in said bladder caused by body-weight loss produced by the individual's pedaling of said bicycle.

5. An exercise bicycle according to claim 4, and further comprising a hollow, compressible, elastomeric bulb connected by tubing to said bladder from pumping gas into said bladder, and a check valve connected to the tubing connecting said bulb and said bladder, said check valve being adjustable to control the flow of air between said bladder and the atmosphere.

* * * * *